Oct. 16, 1951     F. D. MEREDITH ET AL     2,571,596
COMMODITY VENDING AND COIN CHANGE CONTROL MACHINE
Filed Nov. 8, 1946     8 Sheets-Sheet 2

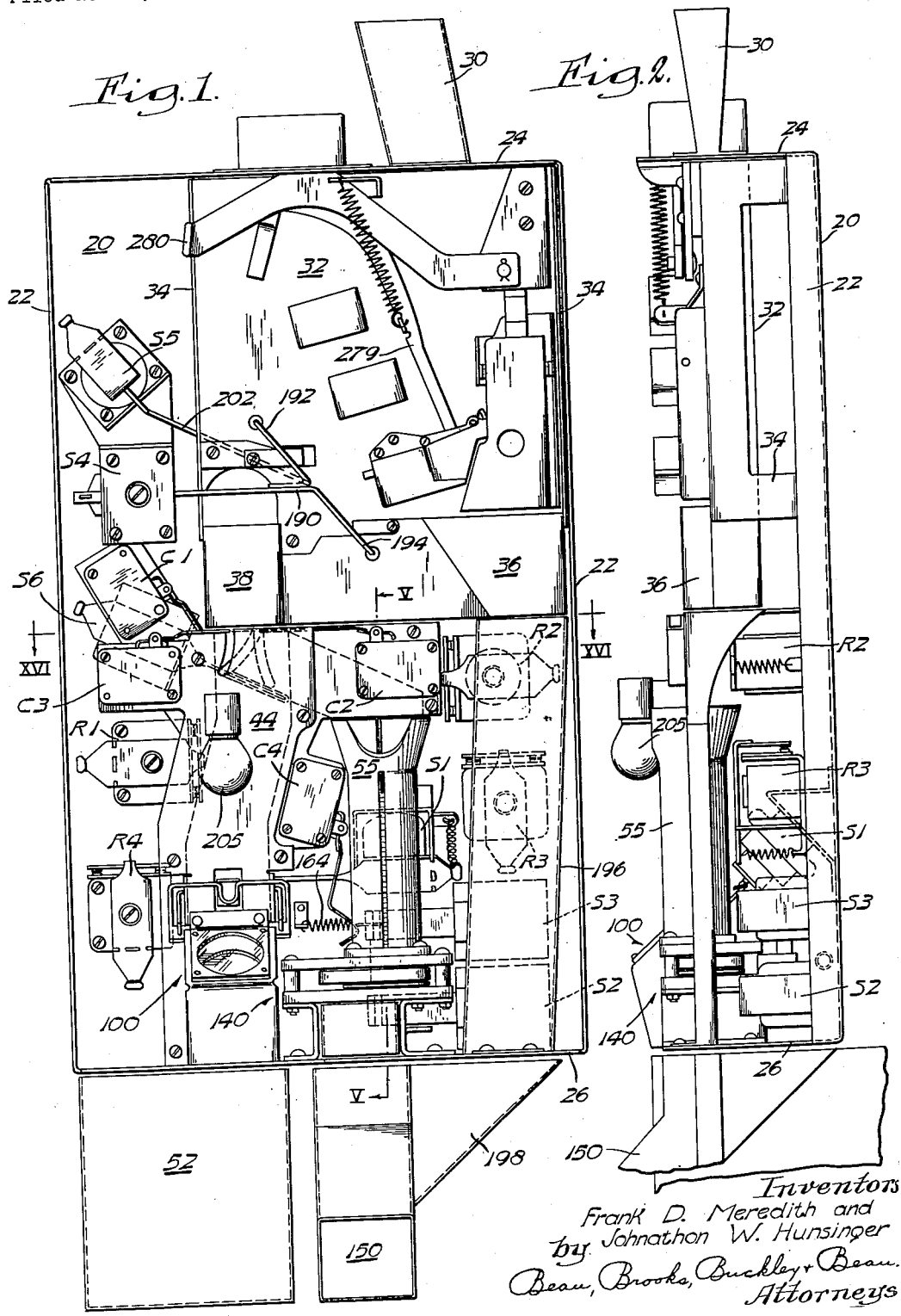

Inventors
Frank D. Meredith and
Johnathon W. Hunsinger
by
Bean, Brooks, Buckley & Bean
Attorneys Oct. 16, 1951     F. D. MEREDITH ET AL     2,571,596
COMMODITY VENDING AND COIN CHANGE CONTROL MACHINE
Filed Nov. 8, 1946                      8 Sheets-Sheet 3
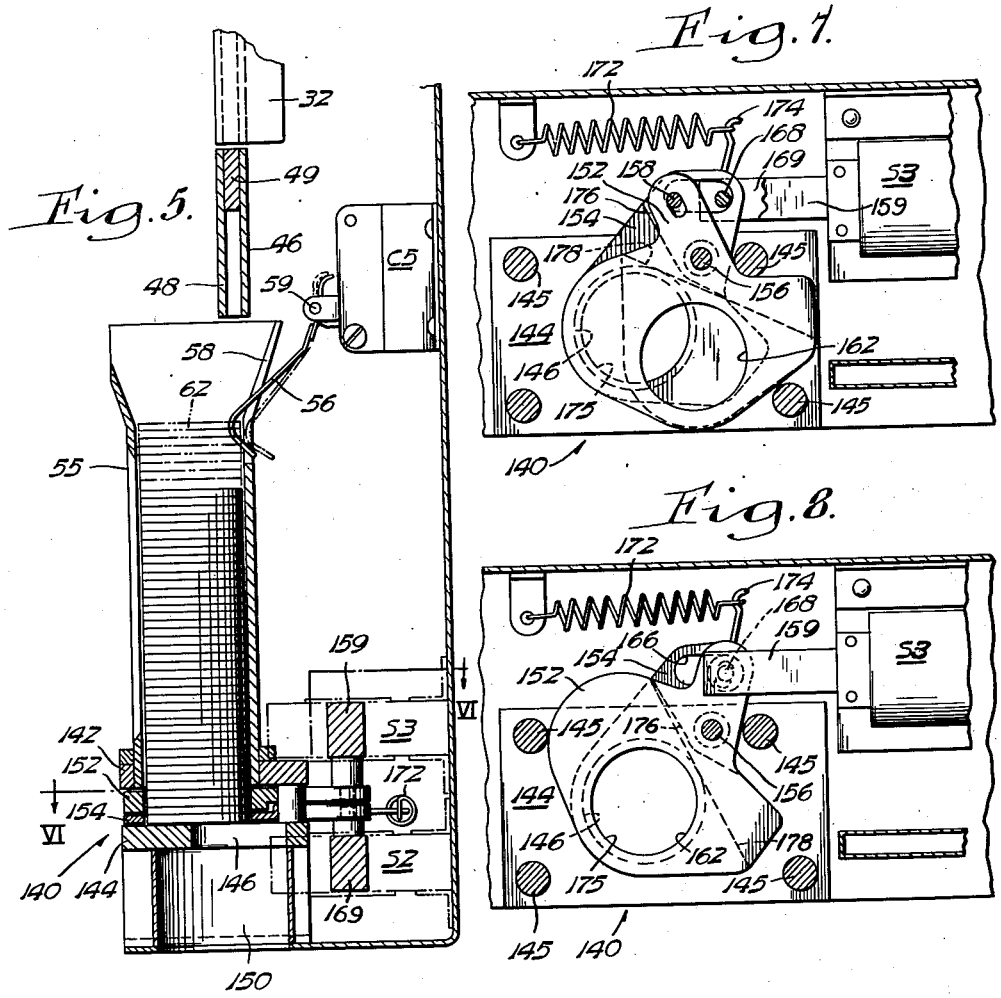
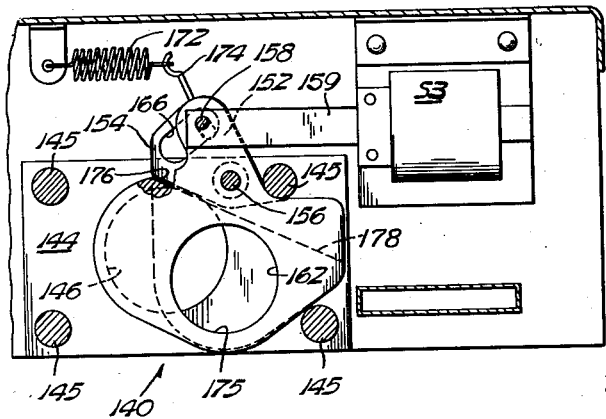
Inventors
Frank D. Meredith and
Johnathon W. Hunsinger
by
Bean, Brooks, Buckley & Bean.
Attorneys

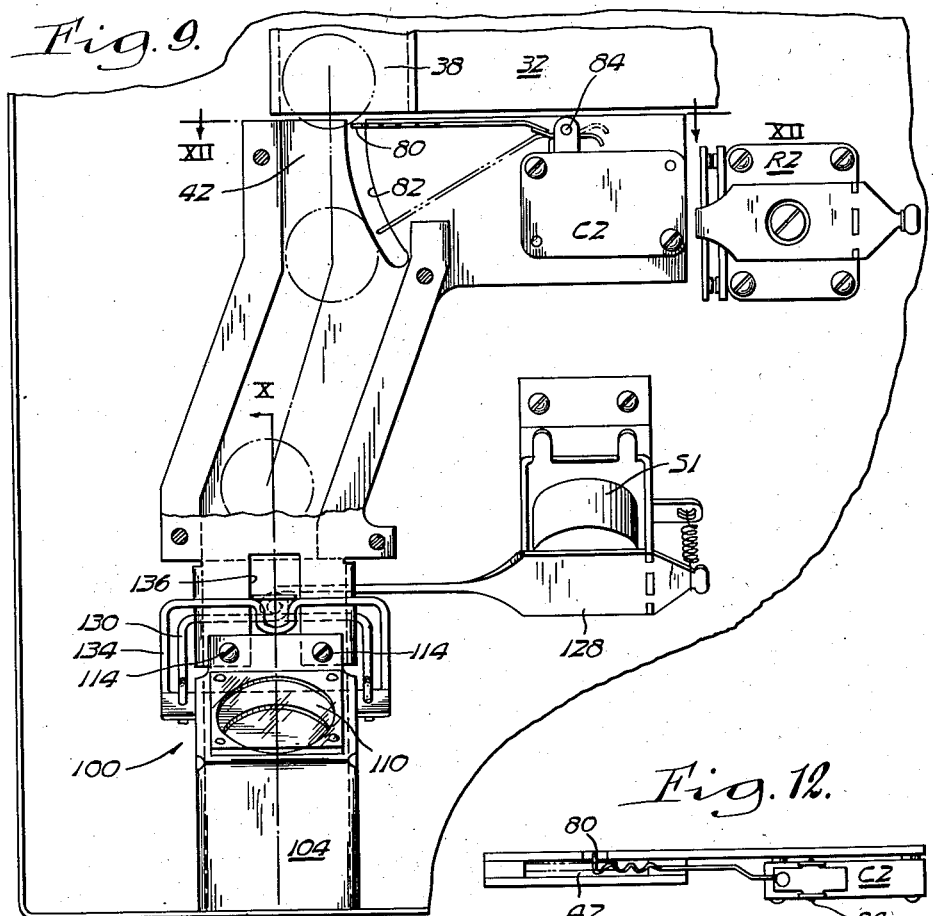
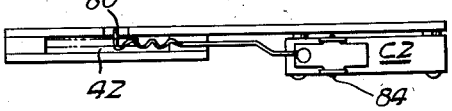
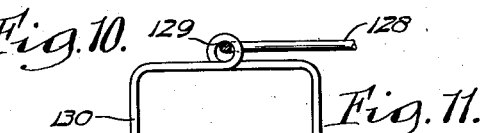
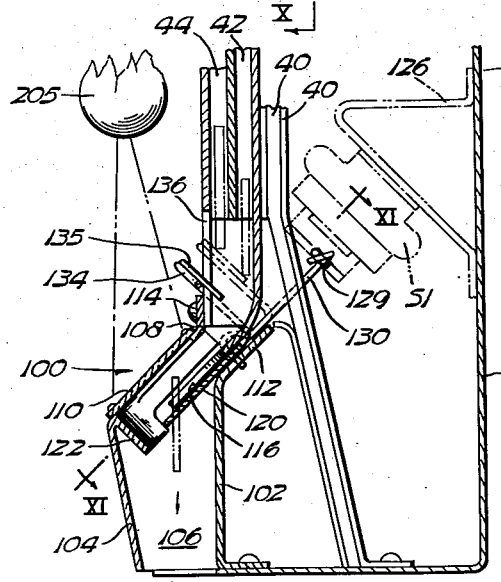

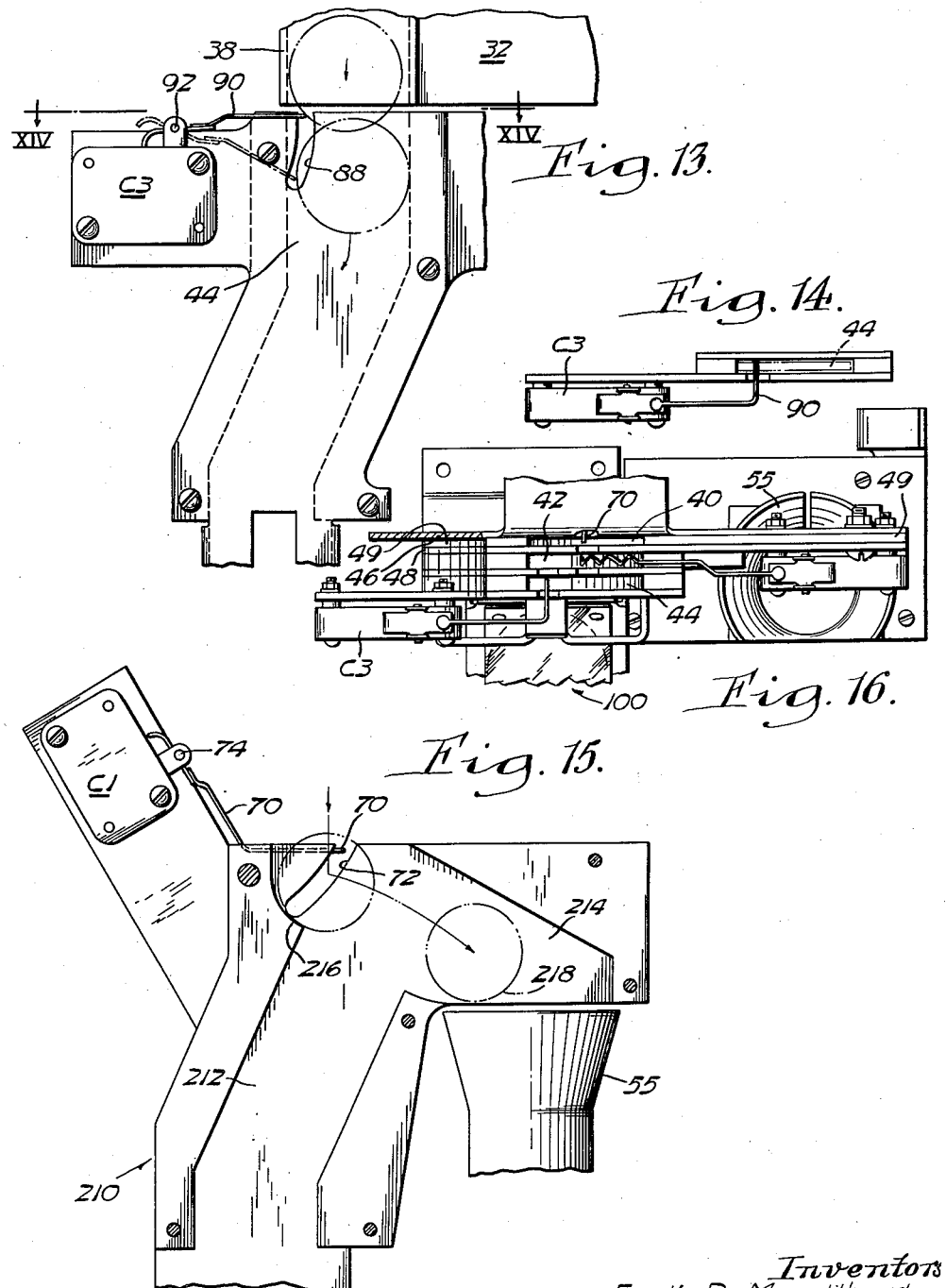

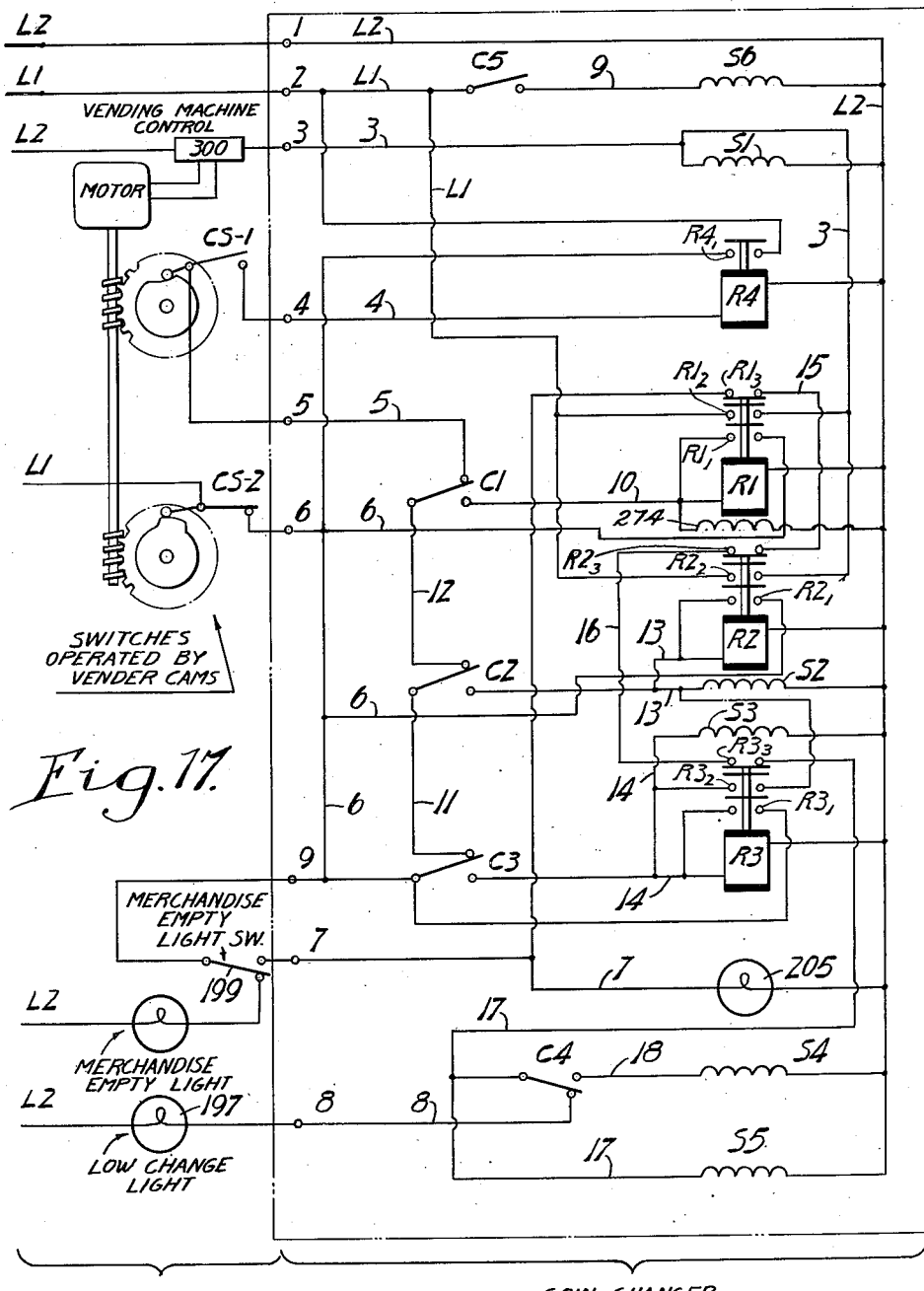

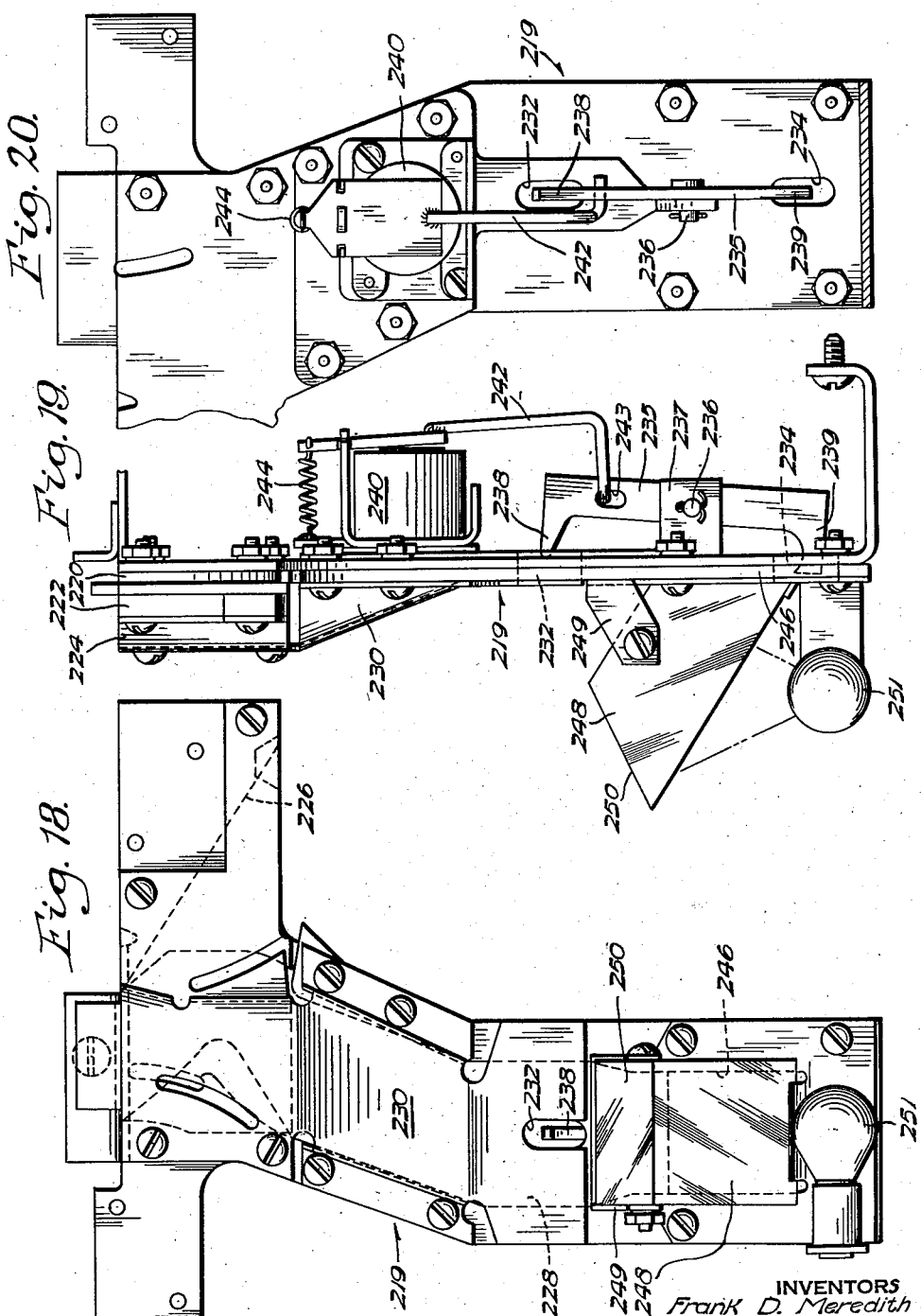

Oct. 16, 1951 F. D. MEREDITH ET AL 2,571,596
COMMODITY VENDING AND COIN CHANGE CONTROL MACHINE
Filed Nov. 8, 1946 8 Sheets-Sheet 8

INVENTORS
Frank D. Meredith and
Johnathon W. Hunsinger
BY
Beau, Brooks, Buckley + Beau.
ATTORNEYS Patented Oct. 16, 1951

2,571,596

UNITED STATES PATENT OFFICE 2,571,596

COMMODITY VENDING AND COIN CHANGE CONTROL MACHINE

Frank D. Meredith and Johnathon W. Hunsinger, Burlington, Vt., assignors to Bell Aircraft Corporation, Wheatfield, N. Y.

Application November 8, 1946, Serial No. 708,520

2 Claims. (Cl. 194—10)

This invention relates to improvements in coin changing and/or coin-controlled mechanisms; and more particularly to mechanisms of the type which are adapted to be attached to merchandise vending machines for automatically controlling dispensing operations thereof and for returning correct change whenever coins are inserted which are of greater value than the cost of the article dispensed. Also, the invention relates to improvements in devices such as may be employed simply for coin changing purposes, dispensing correct amounts of small coins in return for deposited coins of larger denomination.

One of the more general objects of the invention is to provide a machine of the character referred to which is so improved compared to prior art arrangements as to provide failureproof and over-all smoother operations as well as improved speeds of operation.

Another object of the invention is to provide a machine incorporating improved safeguards against misfunctioning of the mechanism.

Another object of the invention is to provide a mechanism of the character described which automatically operates in improved manner to maintain its change coin storage in ready condition.

Another object of the invention is to provide in a mechanism of the character described improvements in the coin handling elements thereof, whereby to facilitate accurate and uninterrupted operation of the mechanism.

Other objects and advantages of the invention will appear from the specification hereinafter.

In the drawings:

Fig. 1 is a front elevation of a mechanism of the invention of such form as to control vending of articles priced at 5 cents, with the front cover plate thereof removed and showing the 25 cent coin deposit chute arrangement in the foreground;

Fig. 2 is a side elevation thereof as viewed from the right of Fig. 1;

Figure 3:
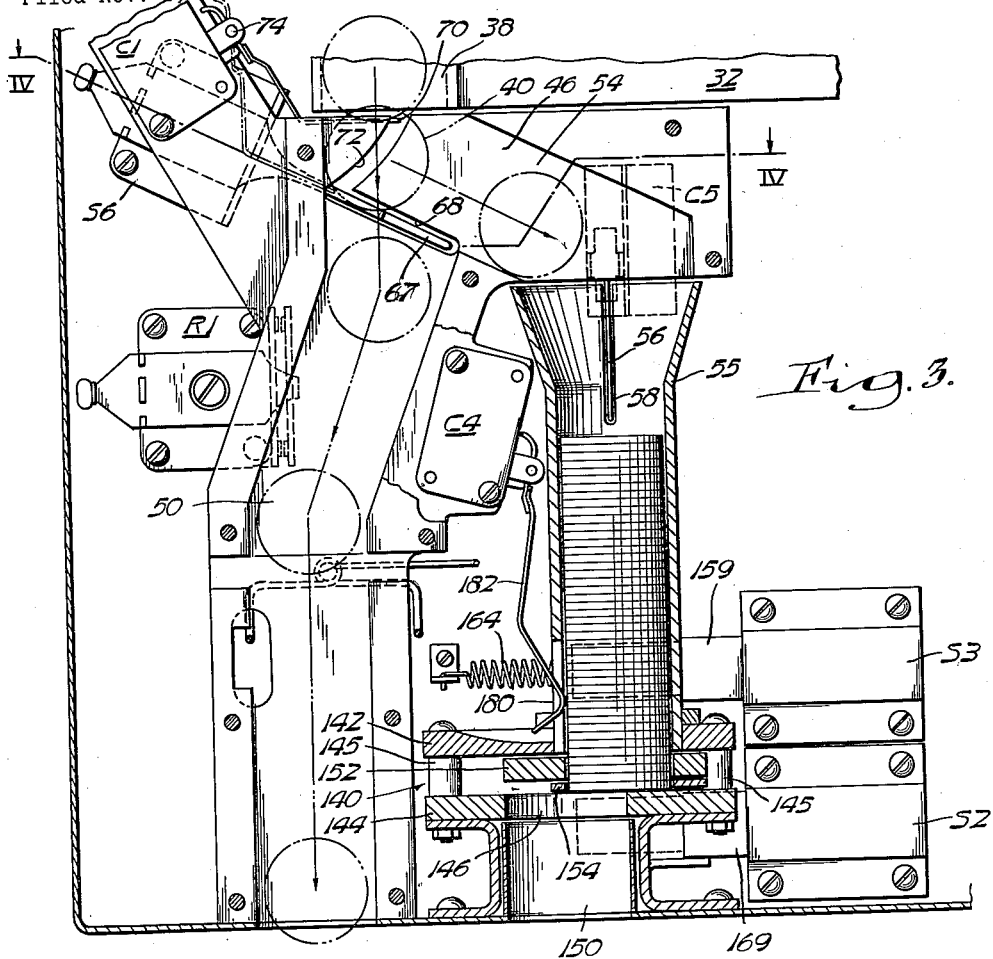
Figure 4:
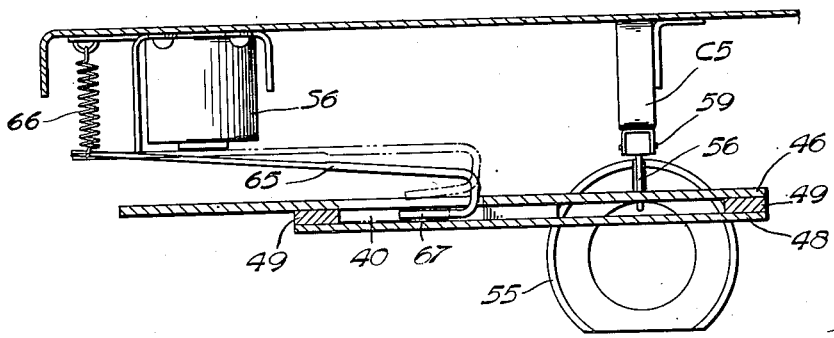

Fig. 3 is an enlarged fragmentary view of a portion of Fig. 1 with the 25 cent and 10 cent coin chute arrangements removed to show the 5 cent coin chute arrangement;

Fig. 4 is a section along line IV—IV of Fig. 3;

Fig. 5 is a fragmentary section, on a larger scale, taken along line V—V of Fig. 1;

Fig. 6 is a fragmentary section, taken along line VI—VI of Fig. 5 showing the change dispenser means in one position;

Figs. 7–8 are views similar to Fig. 6 showing the coin change dispensing mechanism in other positions;

Fig. 9 is a fragmentary view of a portion of Fig. 1 on a larger scale, with the 25 cent coin chute arrangement removed to show the 10 cent coin chute arrangement;

Fig. 10 is a fragmentary section along line X—X of Fig. 9;

Fig. 11 is a fragmentary section along line XI—XI of Fig. 10;

Fig. 12 is a section along line XII—XII of Fig. 9;

Fig. 13 is a fragmentary front elevational view of a portion of Fig. 1 on a larger scale showing the 25 cent deposited coin chute and control elements of the mechanism;

Fig. 14 is a view taken along line XIV—XIV of Fig. 13;

Fig. 15 is a fragmentary front elevation of an alternative form of the 5 cent coin chute and change reservoir feed control means;

Fig. 16 is a fragmentary section, on a larger scale, along line XVI—XVI of Fig. 1;

Fig. 17 is a wiring diagram of the electrical control system of the mechanism of Figs. 1–16;

Fig. 18 is a front elevation of an alternative form of coin chute and coin viewing device which may be employed in lieu of the arrangement illustrated and described hereinabove;

Fig. 19 is a side elevation of the device of Fig. 18;

Fig. 20 is a fragmentary rear elevation thereof; and

Figure 21:
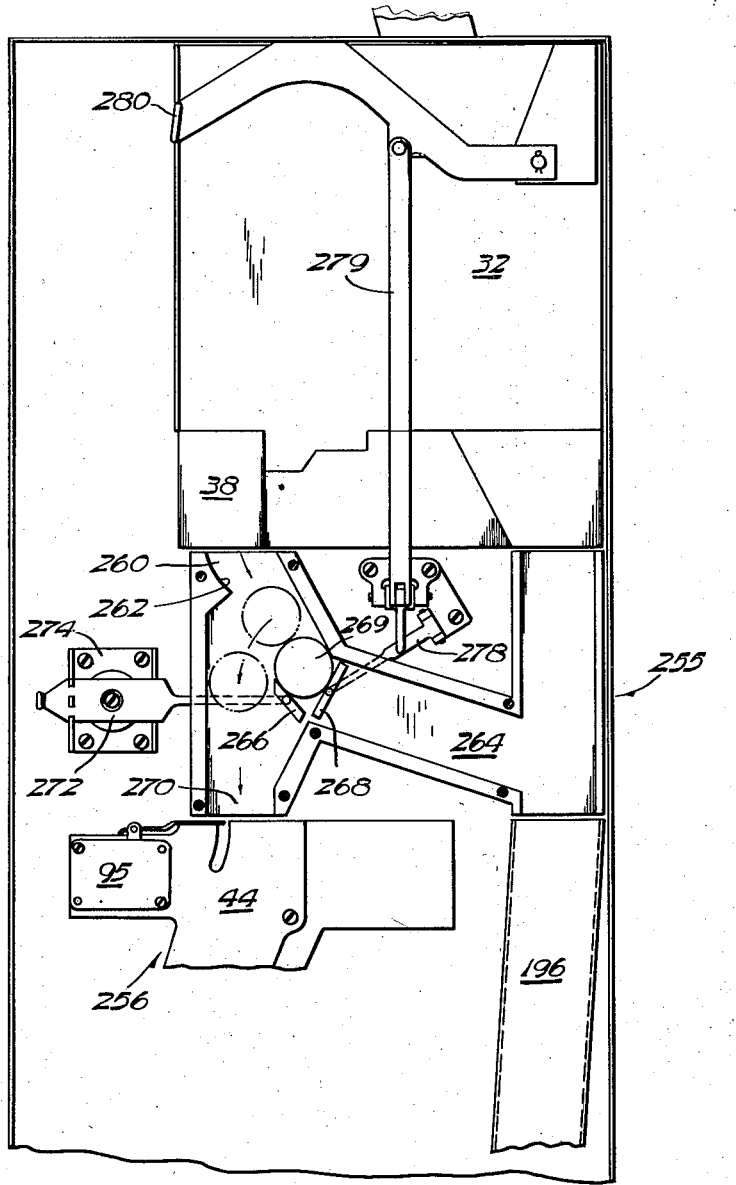

Fig. 21 is a fragmentary front elevational view of a dispensing machine assembly embodying a coin-slug segregator unit and vending control and change making device as previously illustrated, but having disposed therebetween a supplementary unit adapting the machine to vend articles priced at 10 cents.

The invention is illustrated in the drawing by way of example to comprise a mechanism which is assembled into extremely compact form, and housed within a casing including a back plate 20 which is flanged at each side as indicated at 22 for stiffening purposes and at its top and bottom as indicated at 24–26 respectively, to provide corresponding top and bottom sills. Thus, the back plate defines an open front box-like frame which is adapted to be bolted or otherwise mounted upon a side or wall portion of a vending machine or the like such as is to be controlled by the mechanism of the invention. Any suitable front cover plate may then be applied to enclose the mechanism.

It is to be understood that mechanisms embodying the present invention may be constructed so as to handle any coin or combination of coins of various denominations and to withhold any coin or combination of coins in exchange for a deposited coin and/or dispensing of one or more articles to be vended. However, for the purposes of illustration herein the mechanism of the drawing is shown and described as being designed to receive nickels, dimes and quarters and to operate in response thereto so as to actuate an accessory dispenser control device permitting delivery of five cent articles while simultaneously returning correct change in the form of either nickels or dimes according to the denomination of the deposited coin.

The coin deposit chute is shown as a funnel-shaped coin receptacle 30 fixed to extend upwardly from the top wall plate 24. The bottom end of the coin receptacle 30 is in registry with a coin slot through the top wall 24, and thus a deposited coin is guided to fall by gravity edgewise therethrough and into the coin receiver portion of a multiple coin segregating and counterfeit coin rejecting apparatus such as may be separately assembled as a unit designated generally at 32 (Figs. 1-2) independently of the mechanism of the present invention. The device 32 may be called a coin-slug segregator unit and constitutes no part of the present invention, and is shown to be fastened in position against the back plate 20 by means of a bracket 34 for initially screening deposited slugs and coins prior to their delivery to the vending and change making control mechanism of the present invention.

Numerous mechanisms as referred to hereinabove for segregating various coins and rejecting counterfeit coins have been previously developed; and one such mechanism, for example, is currently being manufactured by National Slug Rejectors, Inc., and is described in detail in U. S. Patent 2,292,628. As illustrated in Fig. 14 of this patent, the mechanism thereof includes an arrangement involving a coin chute for discharging spurious coins and separate chutes for discharging good nickels; good dimes; and good quarters. Thus, in the present patent application the drawing herein illustrates the coin segregating and slug rejecting mechanism 32 to similarly include a slug rejection port 36 and a triple compartmented chute 38 which is arranged to discharge in parallel paths, nickels, dimes and quarters which have been tested and passed by the mechanisms interiorly of the unit 32.

The mechanism of the present invention as illustrated herein includes separate chutes 40—42—44 for receiving good nickels, dimes, and quarters, respectively (Figs. 3-9-13); the inlet ends of the chutes being disposed in registry with the corresponding coin discharge ports of the coin segregator 32. As the coins slide down in response to the forces of gravity through their respective chutes they push against and depress electric circuit control arms thereby energizing the accessory vending machine dispensing circuit as well as appropriate circuits for initiating dispensing of proper change.

For example, in the arrangement illustrated and described hereinafter whenever a 5 cent coin is deposited only one 5 cent article will be delivered by the accessory dispenser and no change returned. When a 10 cent coin is deposited one 5 cent article will be delivered and a nickel will be returned. If a 25 cent coin is deposited one article will be delivered and four 5 cent coins returned. Arrangement is made whereby whenever the coin device and the vending machine have been energized by deposit of a proper coin and are in the process of an operative cycle any newly deposited coins reaching the coin segregating unit while the said cycle of operation is still in continuance will be "slugged" and returned directly to the customer. A more detailed description of the operative mechanisms and of the electrical control apparatus will now be furnished.

To accommodate 5 cent coin deposits the chute 40 is constructed to comprise back and front plates 46—48 which are supported in parallel spaced relationship by means of edge spacers 49—49. The chute structure is shown to be of bifurcated form; that is, with one leg directed downwardly as indicated at 50 for delivery of deposited nickels into the main storage coin box as indicated at 52 (Fig. 1); the second leg of the coin chute 40 being divergent laterally as indicated at 54 for delivery of deposited nickels into the upper end of a coin change supply column 55; out of the bottom of which correct change is automatically dispensed as required in connection with deposits of 25 cent and 10 cent coins, as will be explained hereinafter.

To control deposited nickels to be directed either into the coin box 52 or into the change column 55, a control arm 56 is provided to extend through a slotted wall portion 58 of the coin change column (Figs. 3-4-5); the other end of the arm 56 being pivotally mounted as at 59 upon a "high change" switch C5 and operatively connected therewith so that whenever the layer of stacked coins within the coin change column 55 reaches the elevation of the inner end of the arm 56 (as indicated at 62, Fig. 5), the coins therein will depress the arm 56 toward the broken line position thereof in Fig. 5. Such actuation of the arm 56 will in turn close the contacts in the switch C5, thereby energizing a solenoid S6 (Fig. 4) which then operates to pull an arm 65 upwardly as viewed in Fig. 4 against the action of a spring 66; so as to withdraw the outer end of the arm 65 laterally through a slotted portion 68 of the rear wall plate of the coin chute 40. Normally, that is as long as the coin change column is short of being full of change, the arm end portion 67 is biased by the spring 66 into coin blocking position within the chute 40 so as to block off the downwardly directed leg of the chute 40 and to force incoming nickels to roll through the laterally directed leg portion 54 and thence into the coin change column 55. Thus, the change column 55 is automatically maintained in substantially full condition as long as nickels are fed to the machine in suitable proportion to other coins; any nickels in excess of the required proportion being deposited directly into the coin box 52.

In any case, whenever a nickel is received at the upper entrance of the coin chute 40, and regardless of whichever leg of the chute 40 the coin will later follow, the coin will first press against a pivotal finger 70 which extends at its free end through a slotted portion 72 of the chute plate 46. The finger 70 is pivoted at 74 to actuate the contacts of a switch C1; the arm 70 being arranged to actuate the contacts of the switch C1 whenever a nickel drops into the upper end of the chute 40 and thereby depresses the arm 70, regardless of whether the nickel is then permitted to drop directly into the coin box or is diverted by the arm 67 to roll into the coin changer column 55. As will be explained more fully hereinafter in connection with the wiring diagram portion of the drawing, such actuation of the switch C1 will energize the circuit which controls operation of the accessory dispensing machine so that the latter will deliver one 5 cent article to the customer.

As explained hereinabove, whenever a good 10 cent coin passes through the slug rejector mechanism 32 it issues therefrom to fall into the upper end portion 42 of a coin chute which generally parallels the downwardly directed leg 50 of the 5 cent coin chute. As shown in Fig. 9, an arm 80 extends at its free end through a slotted portion 82 of the 10 cent coin chute structure so as to engage 10 cent coins as they fall downwardly through the chute 42. At its other end the arm 80 is pivotally mounted as at 84 and connected to a switch C2; the arm 80 being so arranged as to close the contacts of the switch C2 whenever a 10 cent coin falls through the chute 42 and thereby depresses the arm 80. As will also be explained more fully hereinafter in connection with the wiring diagram portion of the drawing, such actuation of the switch C2 will simultaneously energize the article vending control circuit so that one 5 cent article will be delivered to the customer, and at the same time the change dispensing mechanism which will be described hereinafter will be energized so that a 5 cent coin will be returned to the customer.

The 25 cent coin chute 44 also parallels the course of the main leg of the chute 40 and of the 10 cent chute 42, and as shown in Fig. 13 a side wall portion of the 25 cent chute is slotted as indicated at 88 to accommodate the free end of a control finger 90; the finger 90 being pivotally mounted as at 92 and connected for operation of a switch C3. Thus, whenever a 25 cent coin goes downwardly into the chute 44 it depresses the arm 90 and causes the contacts of the switch C3 to be closed; thereby simultaneously energizing the dispensing machine control mechanism and the coin change dispenser mechanism, as will be explained hereinafter, so that one 5 cent article and four nickels will be ejected from the coin change dispenser.

In order to retain a record of the denomination of the coin last deposited in the machine up until such time as a subsequent deposit is made, so as to settle any controversy as to the denomination of the coin last deposited, the 10 cent and 25 cent chutes 42—44 are directed at their lower ends to divert coins prior to final delivery into the coin box into a coin viewing receptacle which is indicated generally at 100. As illustrated in Figs. 9–11, this receptacle comprises a box-like structure comprising a back plate 102; a front plate 104; side plates 106—106; and an inclined cover plate 108 having a sight opening therethrough and a cover glass 110. The back plate 102 is retractively bent as indicated at 112 (Fig. 10) at its upper end so as to be disposed in spaced parallel relation with the inclined top cover 110; thereby providing a coin inlet throat at the upper rear end portion of the receptacle which is bolted as at 114 to the bottom end of the dime-quarter discharge chute structure 42—44, in open communication therewith. The bottom end portion of the back plate member of the 10 cent coin chute 42 is bent forwardly as indicated at 116 and cut away to provide a semi-circular opening 118 into which either 10 cent or 25 cent coins may drop as they slide off the end of the curved plate portion 116.

A trap door 120 in the form of a plate slipfits between the bent back portion 112 of the receptacle casing and the forwardly bent portion 116 of the coin chute, and is guided thereby to be held up against the bottom of the plate portion 116 so as to provide a tray for holding the coin previously delivered by the apron 116 in full view under the glass 110. A semi-circular end wall 122 is provided integrally with the front wall 104 of the receptacle casing to limit downward sliding movements of coins delivered into the viewing receptacle while being held upon the tray 120. For periodic release of coins so held within the viewing receptacle, a solenoid S1 is mounted upon the back board 30, as by means of a bracket 126; and the armature 128 of the solenoid S1 is connected at its moving end portion by means of a pivot connection 129 to a bale 130 which engages at the ends of its opposite arms with corresponding ears 132—132 formed integrally with the tray plate 120.

A second bale-like wire structure 134 is connected at its opposite end portions to the tray plate 116 so as to extend in cantilever relation therefrom and terminates in a central tab 135 which extends through a slotted portion 136 of the coin chute front cover plate; so that whenever the tray 120 is in its retracted position during the process of releasing a coin previously held in view through the cover glass 110, the pad 135 is simultaneously retracted as to the broken line position thereof in Fig. 10 whereby it serves to momentarily block passage of coins from the chute thereabove. This prevents falling of such coins through the receptacle 100 without first being retained for viewing purposes as explained hereinabove. Immediately upon release of the solenoid S1, however, the pad portion 135 of the tray 120 moves outwardly with the tray as to the solid line position thereof shown in Fig. 10 whereby it avoids interference with coins falling through the coin chute thereabove. The mechanism initiating operation of the solenoid S1 will be explained in detail hereinafter.

The coin changing dispensing unit of the mechanism is indicated generally at 140 and is disposed directly under the coin change column 55 and includes a pair of vertically spaced horizontal plates 142—144 which are interconnected by posts 145. The upper plate 142 is apertured in registry with the bottom end of the coin column 55 so as to permit successive settling of nickels from within the coin column through the plate at 142. The bottom plate 144 is also apertured as indicated at 146 so as to permit nickels to fall flatwise therethrough and downwardly into a change dispensing chute 150; the aperture 146 being laterally offset out of vertical alignment with the column of coins stored within the coin column 55. Thus, to be dispensed through the aperture 146 and into the chute 150, coins from within the column 55 must be laterally displaced into the opening of the aperture 146.

To accomplish such displacement, a pair of apertured plates 152—154 are independently pivotally mounted upon a pin 156 extending between the upper and lower plates 142—144. The plate 152 is pivotally connected as at 158 to one end of the armature 159 of a solenoid S3, and the plate 152 is apertured as indicated at 162 and is adapted to lie either in registry with the vertical axis of the coin column 55 or with the coin change dispensing aperture 146, in response to pivoting of the plate 152 upon the pin 156. The solenoid S3 is arranged to pull the apertured plate 152 to the right as viewed in Figs. 6–7–8 so as to dispose the coin carrying aperture 162 thereof in registry with the change dispensing aperture 146, and a tension spring 164 (Fig. 3) is provided to normally bias the coin control plate 152 back into registry with the coin column 55.

The coin control plate 154 is slotted as indicated at 166 to accommodate pivotal connection 168 with the armature 169 of a solenoid S2. A tension spring 172 connects at one end to the machine frame and at its other end to a finger 174 extending integrally from the coin control plate 154; the plate 154 being apertured as indicated at 175 and so positioned that when the spring 172 pulls the control plate 154 to the left as viewed in Figs. 6-7-8 the coin passage aperture 175 in the plate 154 is in registry with the vertical axis of the coil column 55. However, when the solenoid S2 pulls the plate to the right as viewed in Figs. 6-8, the coin aperture in the plate 154 is disposed in registry with the change dispensing aperture 146 in the bottom plate 144.

As indicated at 176, the coin control plate 154 is provided with an upstanding shoulder against which a corresponding depending shoulder 178 of the change control plate 152 abuts when both control plates are in non-dispensing position; that is, having their coin apertures in vertical alignment with the column 55. Thus, the coin change control plate 154 is free to be pulled by the solenoid S3 into coin change dispensing position independently of the coin change control plate 152, such as to the position shown in Fig. 7 as distinguished from the non-dispensing positions illustrated in Fig. 6. On the other hand, whenever the solenoid S2 operates to pull the change control plate 152 away from its non-dispensing position as illustrated in Fig. 6 into the dispensing position thereof, the plate 152 automatically pulls upon the plate 154 so as to also pull the latter into dispensing position, as illustrated in Fig. 8. The change control plate 152, at the coin aperture portion thereof is formed to a vertical thickness dimension substantially equal to the width of three nickels when in vertically stacked relation; and the lower change control plate 154 is provided at its coin aperture portion to be of a vertical thickness substantially equal to that of a single nickel. Therefore, it will be understood that upon actuation of the solenoid S2 only the lower change control plate 154 will be pivoted so as to displace one nickel away from the bottom of the stack of change coins into the dispensing chute 150, whereas whenever the solenoid S3 is energized it pulls upon both of the coin change control plates 152—154 so as to cause both of them to pivot to displace four nickels into registry with the change dispensing chute 150.

To prevent loss by the customer of higher denominational coins whenever the change column 55 becomes depleted of change, such as may be due to a continuous run of 10 cent or 25 cent coin deposits without sufficient replacements of 5 cent coins, the column 55 is slotted as indicated at 180 (Fig. 3) to receive the lower end of an actuating arm 182 which is connected to a "low change" switch C4. In this instance the switch and arm devices are so arranged that as long as approximately seven coins or more repose in the column 55 the arm 182 will be held by such coins in switch-open position; but if the coin supply in the column 55 becomes less than something in the neighborhood of seven coins the arm 182 is released thereby to move inwardly of the slotted portion of the column 55 and thereby closes the switch C4. The switch C4 is connected in series with a solenoid S4 (Fig. 1) which is normally connected through the switch C4 in series with the product dispensing control circuit (as will be explained more fully hereinafter) so as to be normally energized thereby.

The armature of the solenoid S4 carries an arm 190 which is so arranged that when the solenoid is de-energized the arm 190 will be thereby moved so that a pair of fingers 192—194 thereon will be moved through apertures in the side plate portion of the coin-slug segregator unit 32 so as to project into the normal pathways therein of newly deposited 10 cent and 25 cent coins. Thus, if insufficient change is in the column 55 normal passage of newly deposited 10 and 25 cent coins through the segregator unit 32 will be interrupted and such coins will be diverted into the slug rejection chute portion 36 of the unit for delivery through supplemental chutes 196—198 and then out of the coin delivery chute 150, for immediate return to the depositor. Also, as will be explained more fully hereinafter, a lamp circuit will be automatically energized upon closing of the switch C4 so that a warning signal plate reading "Deposit nickels only" will be illuminated by a lamp 197 (Fig. 17) so as to signal prospective customers that only 5 cent coins will be acceptable to the machine. Upon building up of a supply of nickels within the column 55 the switch C4 will again be opened so that the coin reject control arm 190 will be retracted so as to permit 10 cent and 25 cent coins to be received, and the warning light will be de-energized.

Another switch 199 (Fig. 17) which may be called the "merchandise empty" switch is preferably mounted in conjunction with the machine control circuits and arranged to be controlled by any suitable means extending into contact with merchandise stored within the vending machine to which the hereinabove described coin changer is an accessory. Thus, the "empty" switch will be arranged so that its contacts are closed as long as there is merchandise available in the vending machine and in position to be dispensed; but whenever the machine becomes emptied the switch will automatically open, thereby de-energizing the entire dispensing and change making equipment and permitting any deposited coins to be simply diverted from their normal paths by the arm 190, so as to be returned to the depositor. To this end a second coin rejector solenoid S5 (Fig. 1) is also arranged to have its armature connected to an arm 202 extending into the normal pathway of deposited five cent coins when the circuits are de-energized; the solenoid S5 causing the arm 202 to be retracted away from interference with deposited 5 cent coins when the vending machine is loaded with merchandise to be dispensed. Also, a lamp as indicated at 205 (Figs. 1-2-10-17) is preferably carried by the coin changing mechanism so as to illuminate any coin held within the coin viewing receptacle 100; and the lamp 205 is connected into the vending machine operating circuit so that whenever there is merchandise available to be dispensed the lamp 205 will operate.

Whereas in the description hereinabove the coin changer mechanism embodied a change storage and storage by-passing system including a switch device C5 and a coin deflecting solenoid and arm arrangement as indicated at 64—67 (Figs. 3-4); an alternative arrangement is illustrated in Fig. 15 to comprise a 5 cent coin chute device 210 disposed between the 5 cent coin discharge port of the unit 32 and the change column 55. As in the case of the chute arrangement of Fig. 3, the chute 210 includes a downwardly directed leg portion 212 for conveying coins from the unit 32 into the coin box 52, and a laterally inclined leg 214 for directing 5 cent coins to travel from the unit 32 into the change column 55. Also, as shown in Fig. 3, the upper end of the coin chute device mounts the nickel control switch C1 for closing the switch contacts and actuating the relays as each tested 5 cent coin drops from the unit 32.

However, in the case of Fig. 15, the chute device 210 includes a curved baffle surface 216 which functions as an anvil against which incoming coins fall and are deflected thereby to bounce over into the lateral leg portion 214 so as to fall into the upper end of the change column 55. The leg portion 214 is vertically dimensioned so as to accommodate only one coin while in edgewise position, such as is indicated at 218, whereby it will be understood that whenever the change column 55 is fully loaded with nickels in flatwise stacked relation the next coin deflected from the anvil portion 216 will be blocked by the stack of coins in the column 55 and will simply remain in edgewise position as indicated at 218. This blocks the leg portion 214 of the chute device whereby the next coin deflected from the anvil 216 will strike against the coin at 210 and be thereby deflected again and downwardly into the chute portion 212 for direct delivery to the coin box 52. Thus, the arrangement of Fig. 15 eliminates the need of a high change switch and solenoid such as indicated at C5–64 in Figs. 3–4.

To prevent misfunctioning of the machine such as might otherwise be caused by a coin becoming jammed in one of the coin chutes in such manner as to hold either one of the coin actuated switches C1–C2–C3 in closed position so as to permit continual cycling of the vending machine and dispensing of change from the column 55, a secondary relay and switch circuit is provided in conjunction with the dispensing machine control circuit. Thus, the dispensing machine control circuit is arranged to include a pair of single pole double throw switches; one of which is normally closed in a circuit when the machine is inactive, so that whenever a coin is deposited so that it contacts with an actuating arm of either of the coin switches C1–C2–C3, the circuit to the motor of the vending machine is completed, thereby causing the vending machine to start. A cam or other mechanical device is arranged upon the dispensing machine so that whenever the dispensing motor starts the cam or the like automatically closes the second switch of the control circuit and opens the first switch. If the coin which initiated the circuit energizing action passes freely by its coin switch arm after having caused the contact, the actuating arm of the coin switch returns immediately to its normal or closed position, thus completing a circuit including the first mentioned switch of the vending machine control. A relay R4 thereupon becomes energized and locks itself in closed position and energizes the coin changer mechanism and completes the circuit to the vending machine motor control, allowing the motor to continue to operate.

In event the coin does not pass freely by the actuating arm of the coin switch and causes it to be held in a depressed position, this prevents the circuit between the first mentioned switch from completing a circuit to the coin switch; thus preventing relay R4 from becoming energized. Thereupon the vending machine and the coin changer will immediately cease functioning; causing all subsequent coins to be returned to the customer until such time as the coin changer can be serviced to remove the jammed coin from the chute and the switch.

Fig. 17 comprises a wiring diagram of the apparatus illustrated and described hereinabove. The coin changer circuit elements are illustrated to lead into push-plug connection terminals indicated at 1–9 inclusive; the other portions of the push-plug connectors being coupled into the vending machine and signal light control circuits and to the power supply conductors which are designated L1 and L2. The vending machine circuits are illustrated to include a conductor leading from power line L2 to connector 3 with a vending machine control device 300 intermediately thereof, whereby flow of current from L2 to connector 3 will energize the control 300 for operation of the vending machine. The vending machine circuit also includes a conductor leading from connector 4 to connector 5 and having in the line thereof a switch CS–1 which is arranged to be actuated between circuit open and circuit closed positions by a cam which is arranged to rotate with the vending machine drive shaft (not shown).

Another conductor leading from L1 to connector 6 includes therein a second vending machine cam operated switch CS–2. A conductor leads from connector 9 to the movable arm of switch 199; the movable arm being arranged to be actuated, as explained hereinabove, to alternative contact positions as the condition of the merchandise load within the vending machine varies between empty and merchandise-available conditions. One of the alternate contacts of the switch 199 leads through a conductor to connector 7, while the other contact of the switch 199 leads through a "merchandise empty" signalling lamp and thence to the power line L2. Another conductor leading from the power line L2 passes through a "low change" signalling lamp 197 and thence to connector 8.

The coin changer machine wiring and control elements are so constructed and arranged as to provide for the following operations. Whenever a 5 cent coin is deposited it displaces the lever arm of switch C1, thereby interconnecting bus 10 and bus 12 which in turn causes relay R1 (which is normally open) to become energized. Thereupon the contacts R1₁ of the relay R1 close and lock the coil of R1 in through bus 6 and line L2. Simultaneously contacts R1₂ of relay R1 close lead L1 with bus 3, thereby energizing the vending machine control and also energizing solenoid S1 through L1 and L2. Solenoid S1 thereupon releases the coin previously held behind the viewing window 110 as explained hereinabove. Also, simultaneously contacts R1₃ of relay R1 open; thereby deenergizing solenoid S4 and S5 so as to adjust the machine to reject any coin subsequently deposited before completion of an operative cycle, by causing such coin to be deflected into the slug rejection chute for direct return to the depositor. Just before the end of each vending machine operation cycle the cam switch CS1 opens its contacts, thereby deenergizing the relays which have been thusly locked in.

Upon deposit of a 10 cent coin the contacts of switch C2 are momentarily closed as explained hereinabove, thereby closing bus 11 with bus 13 and energizing relay R2. Contacts R2–1 thereupon close and lock the coil of R2 and solenoid S2 in through bus 6 and L2. Thereupon solenoid S2 operates to cause a 5 cent coin to be dispensed from the change column 55. Simultaneously therewith contacts R2₂ of relay R2 close bus L1 with bus 3, thereby energizing the vending machine control device 300 and simultaneously energizing the coin viewing control solenoid S1 to release the coin previously held in the coin viewing window. Also, simultaneously with the above, contacts R2-3 of relay R2 open, thereby deenergizing solenoids S4 and S5 so as to cause rejection of any other coin subsequently deposited in the machine prior to completion of the current vending operation cycle.

Upon deposit of a 25 cent coin the switch C3 is momentarily actuated to close its contacts, thereby closing bus 6 with bus 14 whereupon relay R3 is energized. Contacts R3₁ and R3₂ thereupon close and lock the coil of R3; solenoid S3; solenoid S2'; and relay R2 in through bus 6 and lead L2. This causes solenoids S2 and S3 to operate simultaneously, whereby four nickels are dispensed from the change column 55. The relay R2 closes, the contacts R2₂ thereof close, and the circuits to the vending machine control 300 and to the coin sight unit 100 are energized; thereby releasing the previously deposited coin to fall into the coin box 52 and initiating a vending operation cycle. Simultaneously therewith the contacts R3₃ of relay R3 are opened, thereby deenergizing the coin rejection control solenoids S4—S5, as explained hereinabove.

The "low change" switch C4 is so arranged that whenever the supply of change within the column 55 becomes depleted the contacts of C4 will open the circuit between bus 17 and bus 18 while closing the circuit between bus 17 and bus 8; thereby deenergizing solenoid S4 to cause subsequently deposited 10 and 25 cent coins to be deflected into the slug chute and returned directly to the depositor. Simultaneously therewith the connection through bus 8 into lead L2 will cause the "low change" light 197 to be energized. Subsequent replenishment of the change column 55 will actuate the switch C4 so as to deenergize the light 197 while energizing the solenoid S4 to permit deposit of 10 and 25 cent coins.

As long as the vending machine contains vendable merchandise the switch 199 will remain adjusted so as to close lead L1 with bus 7; thereby energizing the coin sight lamp 205 and energizing solenoids S4 and S5 so that coins of any denomination may be received by the machine. When the supply of vendable merchandise becomes exhausted the switch 199 will be automatically adjusted to the position illustrated in Fig. 17 whereby the circuit between L1 and bus 7 is broken; thereby deenergizing the coin sight lamp and deenergizing solenoids S4—S5 so as to cause any deposited coins to be deflected in the slug rejection chute. At the same time the "merchandise empty" lamp is energized to notify prospective customers that the vending machine is empty. Upon reversal of the switch 199 due to refilling of the merchandise container the operative elements of the circuits will be returned to their normal condition.

The vending machine cam shaft and the switches CS1 and CS2 are so arranged that whenever the vending machine is inoperative and at rest following a merchandise dispensing cycle, the switch CS1 is biased to its open position while the switch CS2 is in its closed position. This causes bus 6 to be in series with line L1. The cam and switch devices are arranged, however, so that immediately following commencement of a vending operation the cam shaft moves to close the switch CS1 and to open switch CS2. The closing of CS1 causes relay R4 to be energized through conductors 6—11 at switch C3; through conductors 11 and 12 at switch C2; through conductors 12 and 5 at switch C1; through conductors 5 and 4 at switch CS1; and with line L2. Contacts R4₁ of relay R4 thereupon close and connect bus 6 with power line L1 through another circuit. The cam and switch devices are also arranged so that at the end of the vending cycle the cam shaft will operate to open the switch CS1, thereby deenergizing the relay circuit. Just after the switch CS1 opens, the contacts of switch CS2 close thereby connecting bus 6 to line L1 so that the vending machine control circuit is reset and prepared for restarting of the cycle.

In event either of the coin switches C1, C2, C3 should stick, or if a coin should become wedged between its chute and the respective switch arms so as to hold one of the switches in contact open condition, the vending machine will thereupon start to operate; but as soon as the switch CS2 is opened by the vending machine cam the machine will stop because the circuit to relay R4 will be open since the coin switch which initiated the machine operation did not thereupon return to its normally closed position.

Figs. 18-19-20 illustrate an alternative form of the deposited coin chute and coin viewing portion of the mechanism which may be employed in lieu of the mechanism illustrated specifically in Figs. 9-12. The mechanism of Figs. 18-20 is generally similar in overall appearance to the chute arrangements of Figs. 9-12, and comprises a chute structure 219 which includes at its upper portion three coin receiving slots, designated 220—222—224 arranged to receive nickels, dimes and quarters, respectively, as they drop out of the corresponding discharge ports of the coin slug segregator unit 32. The chute structure is so formed that the nickel slot 220 is forked to include a laterally inclined section 226 for delivery of 5 cent coins to the change column device 55 which is disposed to have its upper end opening just below the lateral chute portion 226. The second or downwardly directed leg 228 of the chute leads directly into the coin box 52; the selective delivery of deposited 5 cent coins to the change column or to the coin box being controlled either by mechanism as illustrated in Fig. 3, or as in Fig. 15.

The dime and quarter receiving slot portions 222—224 of the chute arrangement of Figs. 18-20 are diverted into the downwardly directed leg portion 228 of the chute device, as by means of a baffle cover plate as indicated at 230. Thus, all 10 cent and 25 cent coins which are passed by the coin-slug segregator 32, and all 5 cent coins which are not diverted into the change column are guided by the chute structure to pass into the downwardly directed leg portion 228 thereof. As in the chute arrangements hereinabove described, suitable actuating arms for operating electrical switches controlling the commodity dispensing and change delivery control circuits will be employed in conjunction with the slot portions 220—222—224 so that passage of tested coins therethrough will initiate power dispensing and change making operations.

The front and rear cover plate portions of the chute structure 219 are apertured at two vertically spaced positions as indicated at 232 and 234, and a toggle lever 235 is pivotally mounted as at 236 by means of a bracket 237 against the rear face of the chute structure and is so arranged that inwardly turned end finger portions 238—239 of the toggle are alternatively projected into the apertures 232-234, respectively, as the toggle is rocked upon its pivot 236. A coin sight control solenoid 240 is mounted upon the rear plate of the chute structure and the armature thereof is formed with an arm 242 which extends into linked engagement with an apertured portion 243 of the toggle 235. The arm 242 is biased by a tension spring 244 so that whenever the solenoid 240 is deenergized the toggle will be rocked backwardly at its upper end, as shown in Fig. 19. Thus, the toggle 235 will normally project at its lower end into the coin slot leg 228 so as to block passage of coins therethrough and to hold coins in registry with a windowed portion 246 of the chute front cover plate. A prism 248 of glass or transparent plastic, or any other suitable image transmitting substance is mounted in front of the windowed portion 246 of the coin chute, as by means of a bracket 249, so as to project forwardly and upwardly from the coin viewing window and at a suitable angle so that a person standing in front of the machine will readily view an image of the blocked coin; the image having been transmitted through the prism and projected against its upper surface 250. A lamp 251 is preferably arranged below the prism 248 to illuminate the coin viewing scene.

Thus, it will be understood that subsequent to deposit of a coin by the prospective purchaser, and passage of such coin through the coin slug segregator, the coin will fall through the chute structure of Figs. 18-20 while tripping a commodity dispensing and change making control switch, and will then fall into the lower leg 228 of the chute and rest against the foot of the toggle 235. Hence, while the commodity dispensing and change making operations are proceeding, and for the period thereafter prior to deposition of another coin, the last deposited coin will remain in view under the prism 248. Hence, any controversies relative to the denomination of the coin last deposited may be settled by simply viewing the coin through the prism. Upon later deposit of another coin the tripping of the corresponding control switch as the new coin falls into the upper end portion of the chute structure 219 energizes the release solenoid 240. This causes the arm 242 to move toward the left as viewed in Fig. 10, thereby rocking the toggle 235 in such manner as to release the previously blocked coin from the foot of the toggle so that it is free to fall into the coin box 52, while at the same time momentarily blocking the lower end of the coin chute 228 by reason of projection of the toggle finger 238 into the aperture 232. Thus, the first coin is permitted to fall through into the coin box while the second coin is prevented from doing so. At the completion of the vending and change making cycle that has been initiated by deposit of the second coin the solenoid 240 is deenergized, thereby permitting the spring 244 to move the arm 242 so as to rock the toggle backwardly; thereby permitting the second coin to drop down against the foot of the toggle and to be held thereby in clear view of persons standing in front of the machine.

Fig. 21 illustrates addition to the mechanism hereinabove described of means disposed between the coin-slug segregator unit and the coin control and change making unit, for adapting the machine to permit vending of commodities priced at 10 cents each. Thus, in Fig. 21, the adaptor mechanism is indicated generally at 255 to comprise a unit disposed between the previously referred to coin-slug segregator unit 32 and the top end portion of a coin chute structure of the present invention as hereinabove described, and as is designated generally at 256 in Fig. 21. It must be explained that in order to adapt the coin control and change making unit 256 to the problem of dispensing 10 cent articles and delivering correct change whenever 25 cent coins are deposited, the coin ejection plates 152—154 must be replaced by a single plate having a thickness equal to that of three nickels in stacked relation. Also, only the 25 cent control switch 95 will be wired to the change dispensing mechanism. The adaptor unit 255 must be so constructed as to initiate operation of the vending cycle in response to deposit of either two nickels or one dime; and provision is made herein for return of any single deposited nickel at the will of the customer; so that he may recover a deposited single nickel for example in event that he finds he does not have the required second nickel to initiate the vending operation.

To accomplish the objects of the adaptor mechanism as set forth hereinabove, the unit 255 includes a chute 260 which is disposed immediately below the nickel discharge port 38 of the unit 32; the chute 260 having a projection 262 at its left side which causes an incoming coin to bounce over toward a coin by-pass slot 264. The entrance to the by-pass slot 264 is guarded by means of a coin trap comprising a pair of baffles 266—268 which normally cooperate to form a hopper-like formation adapted to receive and to hold therein the first coin which bounces from the ledge 262, as indicated at 269. Since the first nickel landing in the trap fully occupies the latter, the second nickel deposited after the first nickel simply bounces against the latter and then continues to fall downwardly through the chute and out of a discharge port 270 whereupon it is gravity-delivered into the nickel receiving slot portion of the chute structure therebelow. The baffle 266 is attached to the arm 272 of an electro-magnet 274 which is arranged to be energized by the vending cycle control switch and locked in its energized position for the duration of every vending cycle. The electro-magnetic arm 272 is arranged to withdraw the baffle 266 from coin blocking position upon energization of the magnet 274; and therefore it will be understood that upon passage of the second nickel downwardly into the coin control unit 256 and initiation of a vending cycle thereby the first nickel will be released from the trap and will drop down into the coin chute. To enable the operator to recover the first nickel after it has become lodged in the trap in event he finds that he does not have a second nickel available to cause operation of the machine, a baffle 268 is connected to a linkage device 278—279 which in turn connects to the coin return control lever 280 such as is conventionally furnished as standard equipment in conjunction with the coin-slug segregator unit 32 for permitting manual clearing of coin blockages interiorly of the unit 32. Thus, if the operator discovers he has no second nickel available, he simply presses the lever 280 and his first nickel is released to roll through the chute leg 264 and thence downwardly toward the coin return chute 196.

We claim:
1. In a coin controlled vending machine, a coin deposit chute having a forked portion defining alternate coin passageways, one of said passageways being directed to a coin receiving bank, the other of said passageways being directed into a return chute to by-pass said bank and to return any coin passing therethrough to the depositor, means within said coin deposit chute guiding every deposited coin to move toward said by-pass passageway, a first movable baffle member normally disposed to block said by-pass passageway, a second movable baffle member normally disposed to cooperate with said first baffle member to receive therebetween a coin interiorly of said coin deposit chute and at the region of forking thereof so that whenever a firstly deposited coin moves through said coin deposit chute toward said by-pass passageway it becomes lodged against said baffle members and provides a blockage against which a secondly deposited coin will fall and from which the secondly deposited coin will rebound to fall downwardly into said bank, switch means operable by a coin upon passage of said coin into said bank, motor means controlled by said switch means operable to cause displacement of said second baffle member out of coin blocking position so that said firstly deposited coin will also be freed to fall into said bank, and manually operable means connected to said first baffle member for operation by a depositor to displace said first baffle member subsequent to deposit of a first coin only so that the latter may be released to fall into said return chute for return to the depositor.

2. In a coin controlled commodity vending machine, a first relay, a second relay, a normally open first contact operable by said first relay, a vending machine operation circuit including said first contact of said first relay in series for energization of said operation circuit, a control circuit comprising the coil of said first relay and an energy supply circuit and a normally open second contact of said first relay intermediately of said first relay coil and said supply circuit in series therewith, said energy supply circuit comprising a first cam-operated switch and a normally open contact of said second relay in parallel with said first cam-operated switch, a double throw switch biased to a first position and coin operable to a second position and connected to shunt said second contact of said first relay when said switch is in said second position, a holding circuit comprising the coil of said second relay and a second cam operated switch and said first position of said double throw switch and said energy supply circuit in series, and cam means operable by said vending machine operation circuit to close said second cam-operated switch at the initiation of a cycle of operation of said vending machine and to open said first cam operated switch immediately thereafter and to reopen said second cam operated switch just prior to the completion of said cycle and to reclose said first cam operated switch upon completion of said cycle, whereby operation of the said vending machine is initiated by coin operation of said double throw switch and consequent completion of a circuit through said first relay and said first cam operated switch and whereby said operation is continued by completion of a circuit through said first relay and through the contact of said second relay only if said double throw switch returns to said first position to complete said holding circuit.

FRANK D. MEREDITH.
JOHNATHON W. HUNSINGER.

REFERENCES CITED

The following references are of record in the file of this patent:

UNITED STATES PATENTS

| Number | Name | Date |
| --- | --- | --- |
| 2,008,735 | Weiler | July 23, 1935 |
| 2,050,475 | Sumner | Aug. 11, 1936 |
| 2,075,989 | Jonneret | Apr. 6, 1937 |
| 2,250,051 | Patzer | July 22, 1941 |
| 2,271,397 | McDermott | Jan. 27, 1942 |
| 2,282,269 | Tone | May 5, 1942 |
| 2,323,255 | Sutherland | June 29, 1943 |
| 2,393,004 | Solinski | Jan. 15, 1946 |

FOREIGN PATENTS

| Number | Country | Date |
| --- | --- | --- |
| 111,675 | Austria | Dec. 10, 1928 |